UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

INDIGO-BLUE DYE.

SPECIFICATION forming part of Letters Patent No. 490,408, dated January 24, 1893.

Application filed February 9, 1892. Serial No. 420,880. (Specimens.)

*To all whom it may concern:*

Be it known that I, ALBERT HERRMANN, doctor of philosophy, a citizen of the Empire of Germany, residing at Höchst-on-the-Main, in the Empire of Germany, have invented certain new and useful Improvements in the Production of Indigo-Blue Coloring-Matter; and I do hereby declare the following to be a full, clear, and exact description of the invention, such as will enable others skilled in the art to which it appertains to make and use the same.

The sulphonic acids of the meta-oxy- and meta-amido-tetralkyldiamidotriphenylcarbinols, on being oxidized furnish blue coloring matter of great value; especially the products obtained from the sulphonic acids of meta-oxy-tetra-methyl-diamido-triphenylcarbinol, meta-oxy-tetra-ethyl-diamido-triphenylcarbinol, meta-oxy-dimethyl-dibenzyl-diamido-triphenylcarbinol, meta-oxy-diethyl-dibenzyl-diamido-triphenylcarbinol, meta-amido-tetra-methyl-diamido-triphenylcarbinol, meta-amido-tetra-ethyl-diamido-triphenylcarbinol, meta-amido-dimethyl-dibenzyl-diamido-triphenylcarbinol, meta-amido-diethyl-dibenzyl-diamido-triphenylcarbinol, and from the sulphonic acids of the products prepared by benzylizing these amido-tetrakyl-diamidotriphenylcarbinols. These products dye animal fiber very uniform and solid blue tints. The oxidation of the sulphonic acid mentioned above may be effected by treating them with fuming sulphuric acid, but in this case the oxidation is not very complete. These sulphonic acids are gently and evenly converted into the novel coloring matter by oxidizing them in aqueous solution and preferably in presence of salts of iron or of chromic acid.

The process may be understood from the following examples:

A. *Sulphate of iron as oxidizing agent. Oxidation of the sulphonic acid of meta-oxytetra-methyldiamidotriphenylcarbinol.*—Twenty parts by weight of the mono calcium salt of the disulphonic acid of meta-oxy-tetramethyl-diamidotriphenyl-carbinol are dissolved in about two thousand parts by weight of water, the solution is heated to boiling and slowly mixed with a solution of sixty parts by weight of sulphate of iron in about one thousand parts by weight of water. The liquid is kept at boiling temperature for three or four hours, then has added to it Spanish white, and the boiling is continued until a sample filtered off, on the addition of ammonia remains clear, indicating that it is entirely free from iron salts. The blue solution of the coloring matter is then filtered off and evaporated to dryness.

B. *Chromic acid as oxidizing agent.*—The results obtained by oxidizing above with chromic acid are much more satisfactory. Either an aqueous solution of chromic acid can be used or the solution of a chromate mixed with a quantity of mineral acid necessary to form free chromic acid.

*Oxidation of the sulphonic acid of meta-oxy-tetra-ethyl-diamido-triphenylcarbinol.*—24.6 parts by weight of the mono calcium salt of the disulphonic acid of meta-oxy-tetraethyl-diamidotriphenylcarbinol are dissolved in from two hundred to three hundred parts by weight of water, the solution is heated to boiling and very slowly mixed with a solution of eight parts by weight of $CrO_3$ in water. The oxidation is complete after about two hours, this being ascertained by finding a sample of the solution free from chromic acid. The solution of the coloring matter is filtered off from the precipitate chromic hydrate and is evaporated to dryness.

Among the new blue coloring matter produced in this way, with suitable variation of the quantities of the bodies submitted to reaction in accordance with their molecular weights, may be mentioned as examples the coloring matter produced from the sulphonic acids of meta-oxy-tetra-methyl-diamido-triphenylcarbinol, meta-oxy-tetra-ethyl-diamido-triphenylcarbinol, meta-oxy-dimethyl-dibenzyl-diamido-triphenylcarbinol, meta-oxydiethyl-dibenzyl-diamido-triphenylcarbinol, meta-amido-tetra-methyl-diamido-triphenylcarbinol, meta-amido-tetra-ethyl-diamido-triphenylcarbinol, meta-amido-dimethyl-dibenzyl-diamido-triphenylcarbinol, meta-amido-diethyl-dibenzyl-diamido-triphenylcarbinol, and from the sulphonic acids of the products prepared by benzylizing these amidotetralkyl-diamido-triphenylcarbinols. The coloring matter may be produced also by oxidizing the sulphonic acids of the corresponding meta-oxy- and meta-amido-triphenyl-methans by treatment with the necessary quantity of the oxidizing agents named, but it is more advantageous to convert first the leuco sulphonic acids of the group of dyes referred to into coloring matter, and then to oxidize the coloring matter thus prepared in the manner hereinbefore set forth.

The novel coloring matter is the oxidation product of the sulphonic acids of meta-substituted tetralkyldiamido triphenylcarbinols; it presents itself in form of a powder of copper red color with metallic luster, easily soluble in water showing intense blue coloration.

When boiled with ammonia or soda solution the aqueous solution of the coloring matter does not undergo any perceptible change, when mixed with an excess of mineral acid it assumes a green color.

In an acid bath the coloring matter dyes wool and silk with very uniform blue shades, which excel by their great resistance to action of soap, light and air surpassing in this respect the products now known that are used for dyeing in acid bath.

Having thus described my invention and in what manner it can be performed, that what I claim as new and my invention is:

1. The process for the production of blue coloring matter, which is an oxidation product of the sulphonic acids of meta substituted tetralkyldiamidotriphenylcarbinols, which consists in oxidizing the sulphonic acids of meta-oxy-, meta-amido-, or alkalized meta-amido - tetralkyldiamido - triphenylcarbinols with salts of iron or chromic acid, substantially as described.

2. As a new article of manufacture blue coloring matter, derived from tetralkyl-diamido-triphenylcarbinols, a copper red powder with metallic luster, soluble in water showing intense indigo blue coloration, insoluble in alcohol and benzine, dyeing wool and silk in acid bath very uniform blue shades.

In testimony whereof I affix my signature in presence of two witnesses.

ALBERT HERRMANN.

Witnesses:
JOSEF REVERDY,
HEINRICH HAHN.